United States Patent
Dilley

[11] 3,791,331
[45] Feb. 12, 1974

[54] ELECTRIC OUTBOARD MOTOR

[76] Inventor: Earl H. Dilley, 5900 Chestnut Hill Rd., College Park, Md. 20740

[22] Filed: May 5, 1972

[21] Appl. No.: 250,542

Related U.S. Application Data

[63] Continuation-in-part of Ser. No. 113,411, Feb. 8, 1971.

[52] U.S. Cl. .................................................. 115/17
[51] Int. Cl. ........................................... B63h 21/26
[58] Field of Search.... 115/17, 18; 310/54, 87, 154; 318/295

[56] References Cited
UNITED STATES PATENTS

| 3,183,384 | 5/1965 | Flaherty et al. ........................ 310/54 |
| 3,522,788 | 8/1970 | Montague ......................... 115/18 R |
| 3,711,755 | 1/1973 | Meyer ............................... 115/18 E |
| 3,267,868 | 8/1966 | Page ..................................... 310/54 |
| 3,303,403 | 2/1967 | Bonanno............................. 318/295 |
| 3,674,228 | 7/1972 | Horton................................. 115/17 |

FOREIGN PATENTS OR APPLICATIONS

| 859,657 | 12/1952 | Germany .............................. 310/87 |

Primary Examiner—Duane A. Reger
Assistant Examiner—Charles E. Frankfort
Attorney, Agent, or Firm—Sughrue, Rothwell, Mion, Zinn & Macpeak

[57] ABSTRACT

A battery-operated submersible electric outboard motor having apertures in the motor housing which permit the environmental water in which the boat is floating to flow through the internal motor structure in direct contact with the field and rotor, and with the uninsulated commutator and brush assemblies.

15 Claims, 14 Drawing Figures

3,791,331

PATENTED FEB 12 1974

INVENTOR
EARL H. DILLEY

BY Sughrue, Rothwell, Mion, Zinn & Macpeak

ATTORNEYS

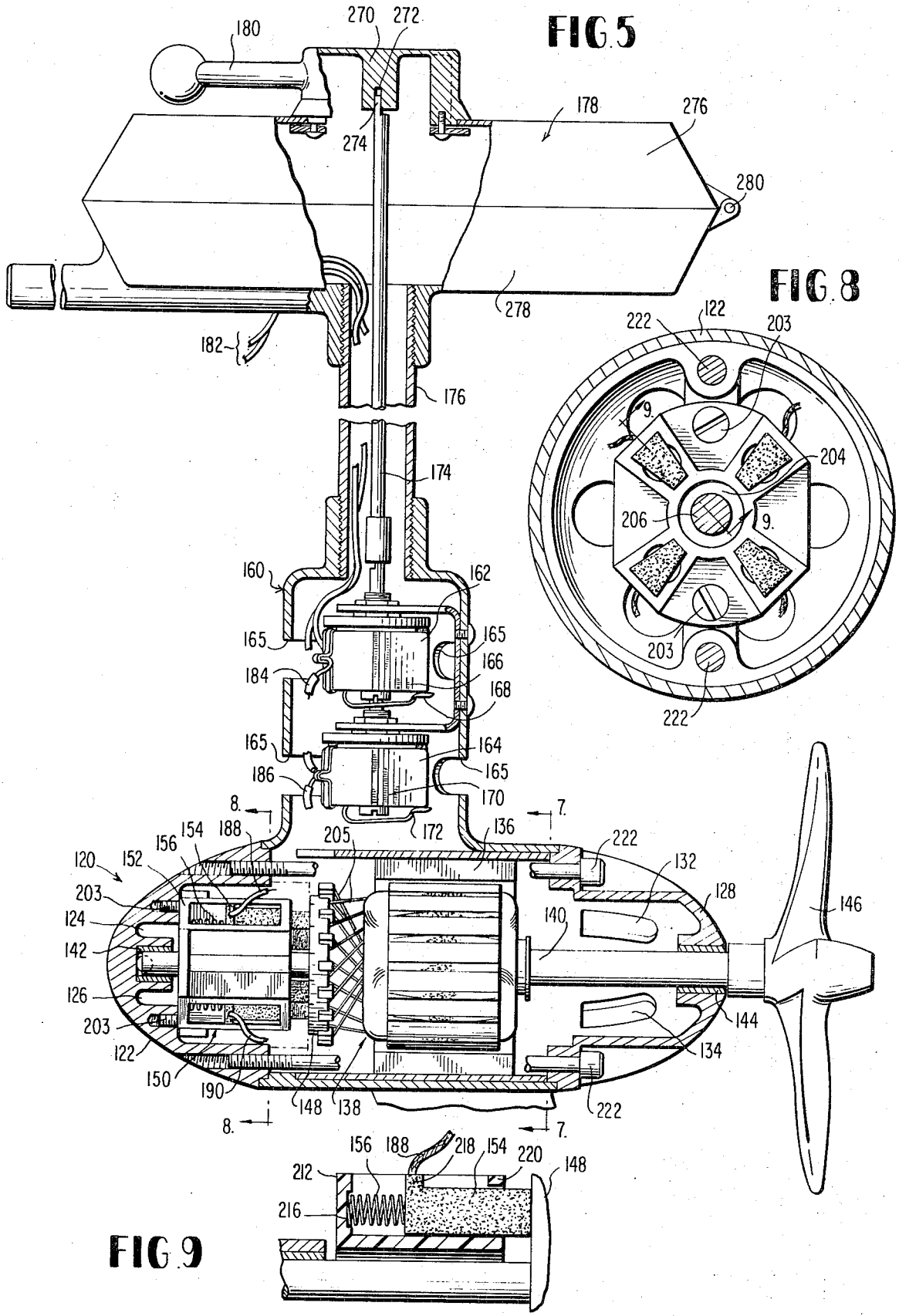

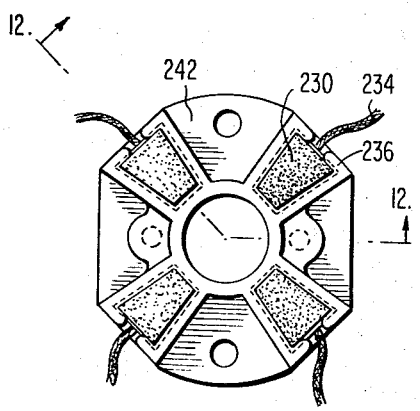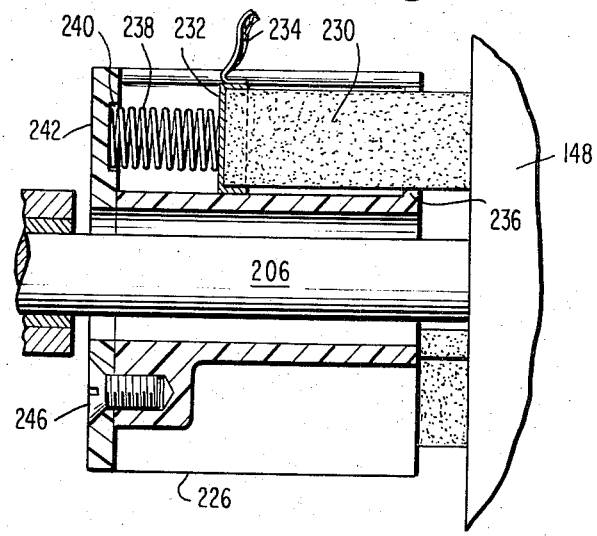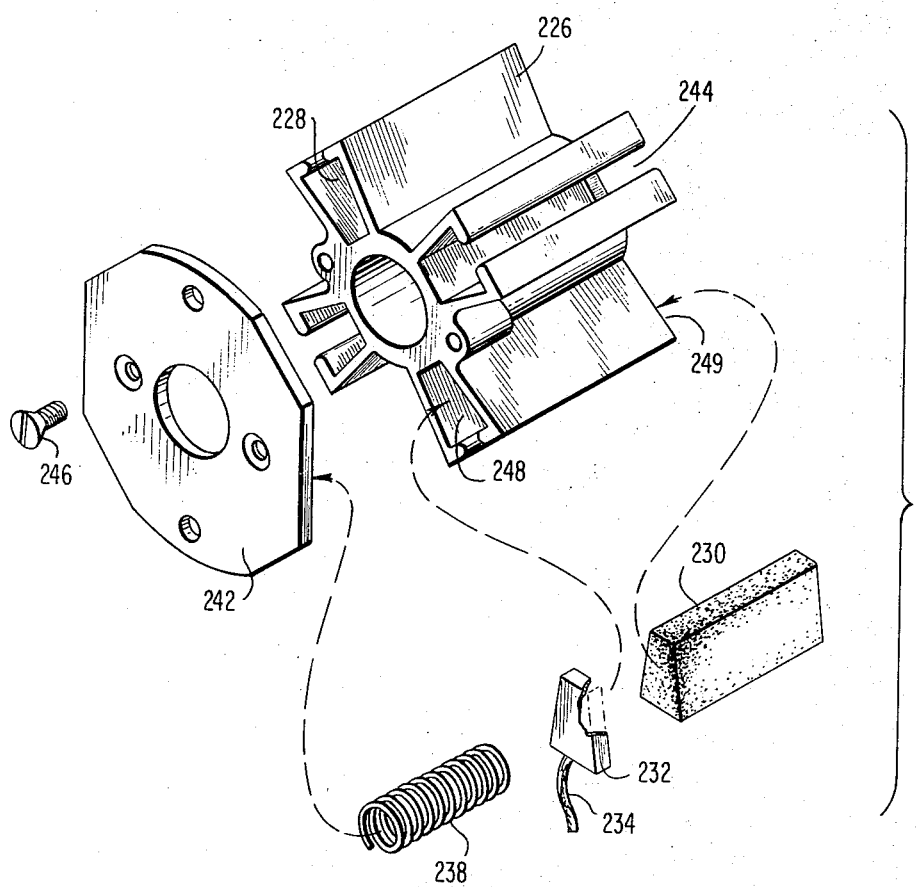

ELECTRIC OUTBOARD MOTOR

This application is a continuation-in-part of application Ser. No. 113,411, filed Feb. 8, 1971.

BACKGROUND OF THE INVENTION

1. Field of the Invention

This invention relates generally to the field of boat propulsion and, more particularly, to an improved electric outboard boat motor and method of operating same. The invention also relates generally to the field of submersible d.c. electric motors.

2. Description of the Prior Art

In the prior art, submersible electric outboard motors were contained in a sealed, leakproof housing for preventing the environmental water from contacting the internal motor structure. Such prior art is illustrated by U.S. Pat. No. 2,824,984 — Harris and U.S. Pat. No. 3,522,788 — Montague, Jr., for example.

Also in the prior art, a.c. induction motors have been cooled by liquids, such as purified water, or other insulating liquids, such as special oils and other compounds, but such induction motors do not have communicator and brush assemblies, and furthermore, the liquid was not impure environmental water (see U.S. Pat. No. 1,216,242 — Macdonald and U.S. Pat. No. 694,639 — Hatch). Furthermore, the liquid was pumped by separate pump means through cooling channels in the motor. When the liquid was environmental water, such as sea water, the electrical parts were additionally insulated, such as by encapsulating them in an epoxy resin or similar compound, as shown in Flaherty, Jr. et al., U.S. Pat. No. 3,183,384, for example, thereby preventing the environmental water from coming into direct contact with the parts. It was improperly assumed that direct contact of the electrical parts with the environmental water would result in short-circuiting of the motor.

In motors with commutators and brushes, the prior art stressed the importance of keeping water away from the contact area between the brushes and commutator segments, as indicated by U.S. Pat. No. 2,780,737 — Labastie et al., for example.

SUMMARY OF THE INVENTION

The object of my invention is to provide an improved submersible d.c. electric motor having greater efficiency than was available in prior art motors.

A more specific object of my invention is to provide an improved electric outboard boat motor for operating while submerged in the environmental water in which the boat is floating, and wherein the motor housing is open to expose the internal electrical motor structure to the environmental water which flows through the motor housing, thereby achieving a high degree of motor cooling with a resulting large increase in motor efficiency.

Another object of my invention is to provide a method of opening an electric outboard motor such that the internal electric motor structure is completely exposed to and cooled by the environmental water in which the motor is submerged.

In the preferred embodiment of my invention, several apertures are formed in the housing of a d.c. motor so that the environmental water flows through the internal electrical motor structure in contact with the stator and rotor, and especially in contact with the exposed, uninsulated commutator and brush assemblies.

As far as I know, I am the first to design a motor of the brush and commutator type in which the environmental water is permitted to flow through the internal motor structure in direct contact with the motor's internal electrical parts, especially the commutator and brush assemblies. Prior art workers assumed such a design would result in a short-circuiting of the motor; however, I have found that such is not the case, and that only a relatively insignificant increase in current is drawn by the motor, even in salt water, as evidenced by actual test results set forth below.

Another object of my invention is to provide such an outboard motor with a continuously variable and reversible speed control.

A further object is to provide such a speed control which includes a potentiometer which is completely exposed for direct contact with the environmental water, thereby increasing the rate of removal of heat from the potentiometer so that the potentiometer may actually be operated at current levels far in excess of its rated power level.

Still another object of my invention is to provide improved novel brush assemblies for use with the motor.

Another object is to provide the outboard motor with an improved top housing which may be used as a storage container.

A further object is to provide an electric outboard motor whose internal structure is directly cooled by the environmental water, with the motor being mounted in the top housing, rather than being submerged in the environmental water.

BRIEF DESCRIPTION OF THE DRAWING

FIG. 5 is a partial cross-sectional view of another embodiment of the invention including a permanent magnetic field, a novel brush assembly, a novel motor speed control assembly including water-cooled potentiometers, and a novel top housing.

FIG. 8 is a cross-sectional view taken along line 7—7 of FIG. 5.

FIG. 9 is a cross-sectional view taken along line 9—9 in FIG. 8.

FIG. 11 is an end view of another embodiment of a novel brush assembly for use with the motors shown in the preceding figures.

FIG. 12 is a cross-sectional view taken along line 12—12 in FIG. 11.

FIG. 13 is an exploded view showing the manner in which the brush is inserted in the brush assembly of FIG. 11.

DESCRIPTION OF THE PREFERRED EMBODIMENTS

Figure 1:
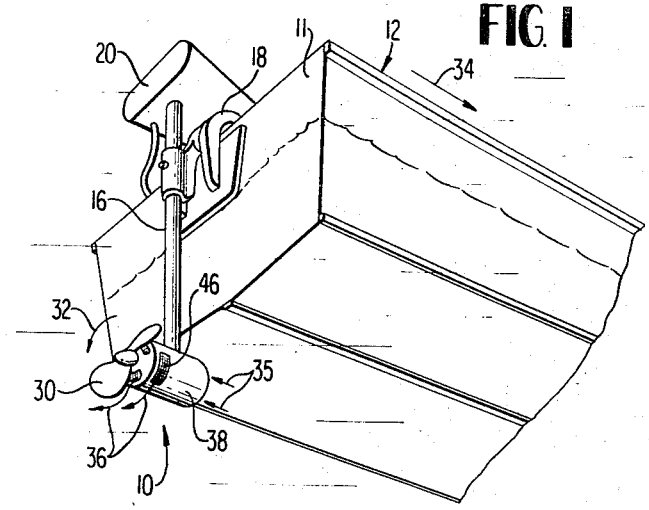
FIG. 1 is a perspective view illustrating my improved electric outboard motor as mounted on a boat and submerged in the environmental water in which the boat is floating.

FIG. 1 is a perspective view showing one embodiment of an improved electric outboard motor 10 mounted on the transom 11 of a boat 12 floating in water 14. The water 14 is any body of water in which the boat may be operated, and the water may be either fresh, i.e., lake water, or salt, i.e., ocean water. In order to distinguish this impure water from the purified water which is used in some pressurized cooling systems for a.c. induction motors, such impure water will be termed hereinafter as environmental water, i.e., the water, fresh or salt, in which the boat is floating. In operation, the motor 10 is completely submerged with the environmental water, and as will be described in more detail below, its internal electrical structure is completely exposed to the environmental water which is therefore in direct contact with the internal electrical components of the motor.

Motor 10 is conventionally mounted on a tubular pipe 16 which is fixed to a clamping mechanism 18 which in turn mounts the motor on the transom 11. Mounted on the upper end of pipe 16 is a control housing 20 in which is located the speed controls for the motor 10.

A sheath 22 contains a pair of electric cables 24 and 26. One end of each cable is adapted to be connected to a storage battery (not shown) located in the boat, and the other end of each cable is connected to a corresponding one of a pair of terminals on the motor housing. For example, in FIG. 2, cable 24 is shown connected to the motor terminal 28; cable 26 is connected to another motor terminal not shown in the drawing.

A propeller 30 is mounted on one end of the motor shaft and is adapted to be rotated by the motor in the direction indicated by the arrow 32. The pitch of the propeller is such that this direction of rotation propels the boat in the direction indicated by the arrow 34, thereby forcing the environmental water 14 to flow through the motor 10 in the direction indicated by the arrows 35 and 36.

Figure 3:
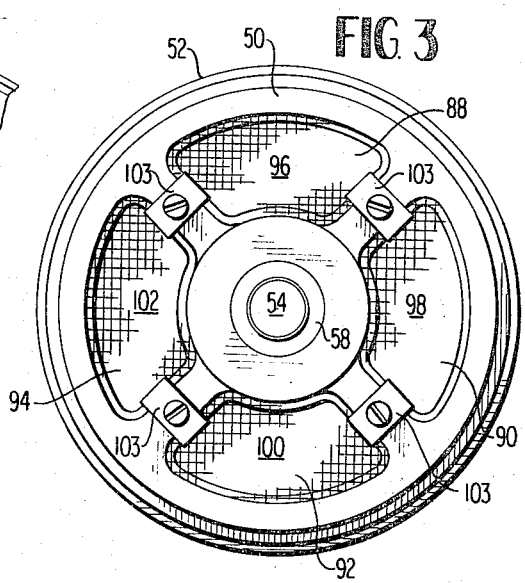
FIG. 3 is an end view of the motor housing of FIG. 2.
Figure 2:
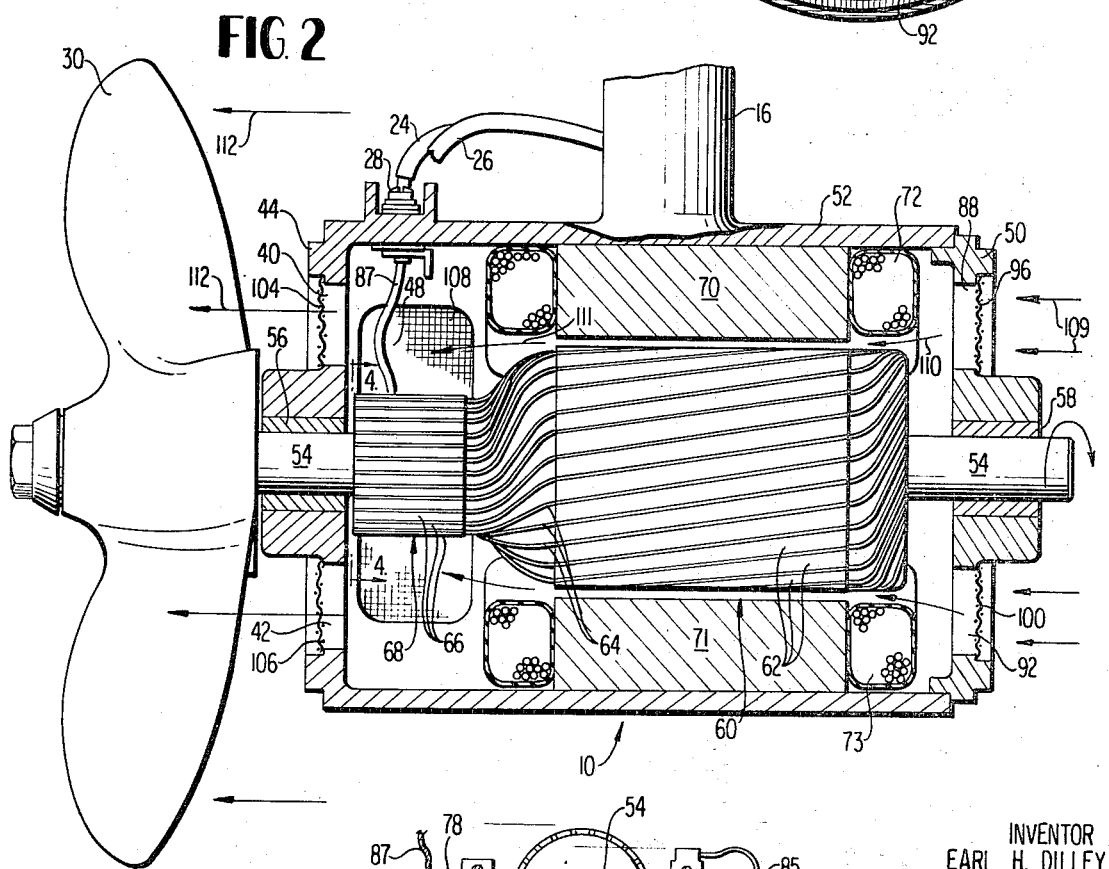
FIG. 2 is a cross-sectional view of one embodiment of the improved electric outboard motor showing its internal structure including a wound field.
Figure 4:
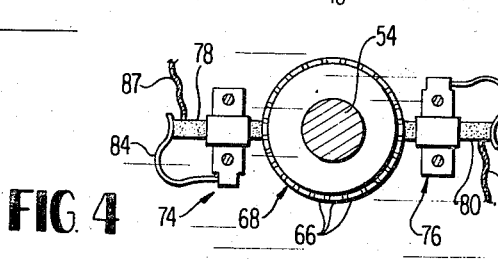
FIG. 4 is a sectional view taken along lines 4—4 of FIG. 2.

As shown more clearly in FIGS. 2 and 3, motor 10 includes a housing 38 having a cylindrical casing 52 closed by two end plates 44 and 50. A pair of apertures 40 and 42 are formed in end plate 44. A pair of apertures 46 and 48 are formed in the cylindrical casing 52 opposite the brush assemblies 74 and 76 (FIG. 4). Four apertures are formed in the end plate 50 which is the water intake end of motor 10. Screens may be placed over these apertures in order to prevent large objects, such as chunks of sand or mud, from entering the motor housing. The main flow of environmental water through the motor enters the motor through the apertures in end plate 50 and exits through the apertures in the casing 52 and end plate 44.

FIG. 3 is a cross-sectional view of motor 10 and shows in more detail the internal motor structure and the apertures in the motor housing which permit the environmental water to flow through the internal motor structure in direct contact with the internal electrical components of the motor.

A motor shaft 54 is rotatably supported in the end plates by a pair of bearings or bushings 56 and 58. The propeller 30 is bolted to one end of shaft 54 so that it rotates therewith. Mounted on the shaft is a rotor core 60 comprising a plurality of teeth 62, forming slots therebetween for carrying the rotor windings 64. These windings are connected to individual commutator bars 66 forming part of a commutator assembly 68 which is also fixed to the shaft 54. Fixed to the inner surface of the cylindrical housing 52 is a pair of motor field poles 70 and 71 on which are wound the field windings 72 and 73, respectively.

As shown more clearly in FIG. 4, the pair of brush assemblies 74 and 76 are mounted on the motor housing. A pair of carbon brushes 78 and 80 are mounted in the assemblies so that the inner ends of the brushes are in engagement with the commutator bars 66 of the commutator assembly 68 mounted on the shaft 54. Springs 84 and 85 bias the brushes into an engagement with the surfaces of the commutator bars. Pigtail conductors 87 and 88 electrically connect the brushes to the motor terminals; for example, pigtail 87 is shown connected to terminal 28 in FIG. 2.

FIG. 3 is a view of the end of the motor housing opposite to the end upon which the propeller 30 is mounted. End plate 50 contains, for example, four peripherally spaced apertures 88, 90, 92 and 94 which may be covered by corresponding screens 96, 98, 100 and 102 for the purpose of keeping large objects from entering the motor housing. The screens may be held in place by suitable clamp means, such as clips 103. Similar screens may cover the apertures in the end plate 44 and the cylindrical casing 52. For example, screens 104 and 106 may cover the apertures 40 and 42, and a screen 108 is shown covering the aperture 48.

The arrows 109, 110, 111, 112 in FIG. 2 show the direction of the movement of the environmental water through the motor housing when the boat 12 is moving through the water in the direction indicated by arrow 34 in FIG. 1. The rotor teeth 62 and the rotor windings 64 are both formed in a spiral configuration with a pitch such that the rotating teeth and windings produce a pumping action which forces the water through the motor in the same direction as indicated by the arrows 109, 110, 111, and 112.

Consequently, the environmental water flows through the motor housing in intimate contact with the internal electrical structure of the motor. In particular, the environmental water flows in direct contact with the field windings, the rotor teeth and rotor windings, the commutator assembly, and the brushes of the motor, thereby quickly removing the heat generated in these components by electric currents. The structure of this improved electric outboard motor provides a greatly increased cooling efficiency as compared with the submersible sealed motors of the prior art. This increase in efficiency is particularly due to the direct contact of the water with the rotor core and winding where approximately 96% of the heat loss is generated in such a motor with field windings. In motors where the field is supplied by permanent magnets, 100% of the loss occurs in the rotor. There is no additional potting compound on the rotor conductors or the extensions thereof which are connected to the commutator segments. Furthermore, the environmental water flows in direct contact with the commutator bars and brushes, and not only cooling these elements, but also functioning to inhibit sparking between the brushes and the commutator bars.

Contrary to what may have been expected, my improved electric outboard motor, whose internal structure is completely exposed to the environmental water, does not short-circuit when submerged in the environmental water in which the boat is operated. I have operated the motor from storage batteries having output voltages of 6 volts, 12 volts, 24 volts, 36 volts and 48 volts and have found that the increased cooling efficiency results in an unexpected increase in motor efficiency, with a corresponding increase in motor speed for a given battery voltage.

The cables 24 and 26 are provided with suitable clips at the upper ends thereof so that they may be connected to the terminals of a suitable storage battery. The lower ends of the cables are attached to the motor terminals, which in turn are electrically connected to the brushes 78 and 80 via the pigtail conductors 87 and 88 and also to the field windings 72 and 73.

My improved electric outboard motor operates both in so-called fresh water, such as lake water, and also in salt or brackish water. Greater current will be drawn from the d.c. power source, such as a storage battery, in salt water than in fresh water, but the motor still operates very efficiently since the heat generated in the motor parts, particularly in the rotor, quickly and efficiently is carried away by the environmental water flowing through the motor housing. The $I^2R$ loss in the rotor is kept at a minimum since the resistance R does not increase, due to the substantially zero temperature gradient in the water in contact with the rotor. By contrast, in the prior art sealed motors, the coolant temperature rises, thereby causing an increase in the rotor resistance and a corresponding increase in $I^2R$ losses.

My completely exposed electric outboard motor is an improvement over prior art motors of the type in which a liquid is sealed within the motor housing. The sealed liquid in such motors creates more friction to the moving parts of the motor, thereby reducing the efficiency of the motor. Furthermore, the brushes of the motor tend to be lifted from the commutator bars by the movement of the entire mass of the liquid which tends to rotate with the rotating rotor. In addition, oils and other like liquids tend to foam, thereby reducing their cooling effect. Furthermore, in sealed motors of the type in which fluid is pumped through the motor, the power required to pump the fluid reduces the efficiency of the motor. Also, the fluid pressure caused by the rotation of the rotor in such sealed motors is much higher because the coolant is confined to only one outlet as compared to my motor which may be considered to be completely open because of the several apertures formed in the motor housing.

At least 96% of the heat generated in such a d.c. electric motor is generated in the rotor, and it is the removal of this heat which is the main problem which must be overcome in increasing the efficiency of such motors. In sealed motors, this heat must be exchanged to the coolant fluid, e.g. air or a liquid, then conducted through the fluid to the motor housing, and then the heat must be conducted through the motor housing walls and to the outside environment, which would be the environmental water in the case of an electric outboard motor. Such a process of heat exchange requires considerable time with the resultant increase in the temperature of the fluid coolant.

By contrast, in my improved d.c. electric motor where the internal motor structure, including the rotor, is completely exposed to the flow of the environmental water, the motion of the motor through the water, supplemented by the pumping action produced by the pitch of the rotor teeth and rotor windings acting as a pump, causes a continuous flow of cool water through the rotor and the other parts of the motor's internal electrical structure, so that there is effectively no temperature increase of the coolant, i.e. the environmental water, and only one heat exchange step takes place.

As indicated above, my improved electric outboard motor runs equally as well in salt water as in fresh water. Below is a table showing the input current drawn by the motor and energized from three different storage batteries having rated outputs of 6 volts, 12 volts and 24 volts when the motor is operated in fresh water with a specific gravity of 1.000, and in two different concentrations of saline water having specific gravities of 1.008 and 1.025. Even though the motor drew more current while operating in the saline environmental water, the motor operated otherwise in the same manner as it did in fresh water.

| INPUT TO MOTOR | | SPECIFIC GRAVITY OF WATER |
|---|---|---|
| Volts | Amperes | |
| 6 | 5.5 | 1.000 |
| 12 | 9.2 | 1.000 |
| 24 | 18.2 | 1.000 |
| 6 | 6.2 | 1.008 |
| 12 | 10.1 | 1.008 |
| 24 | 19.8 | 1.008 |
| 6 | 8.2 | 1.025 |
| 12 | 12.7 | 1.025 |
| 24 | 24.6 | 1.025 |

I have also operated my motor in fresh water with an input of 36 volts and approximately 70 amperes and with an input of 48 volts and approximately 120 amperes. In salt water, the motor will still operate at these higher voltages, even though correspondingly higher currents will be drawn. There is no input voltage limitation imposed on my motor solely because it is operated completely exposed to the environmental water. The only voltage limitations are those imposed by the construction of the motor itself, such as the breakdown voltage of the insulation on the windings.

Another embodiment of my improved electric motor is illustrated in FIG. 5. The motor itself differs from the one illustrated in FIG. 2 in that a permanent magnet field is used rather than a wound field, and the motor includes a novel brush assembly which is an improvement over that illustrated in FIG. 2. Furthermore, the motor illustrated in FIG. 5 and subsequent figures includes a novel speed control which provides for continuous and reversible control of the motor speed and includes two potentiometers which are completely exposed to the environmental water in the same manner as the internal structure of the motor itself. In addition, the embodiment of FIG. 5 includes a novel top housing which is designed so that it can function as a storage container.

Looking at FIG. 5 in more detail, we find that the motor comprises a housing 120 having a front cap 122 with openings, such as 124 and 126, formed therein, and a rear cap 128 having openings, such as 132 and 134, formed therein. The environmental water flows through the front openings into the motor housing, into direct contact with the internal electrical structure of the motor, and flows out of the motor housing through the rear openings, in much the same manner as discribed in connection with the first embodiment of the invention.

In this embodiment of the motor, the field is supplied by a permanent magnet 136 fixed to the motor housing, rather than by the field windings 72, 73 shown in FIG. 2. A rotor 138 is fixed to a shaft 140 which is rotatably mounted in the front and rear bushings 142 and 144 in the front and rear caps 122 and 128, respectively.

A propeller 146 is secured to the rear end of the shaft, and a commutator assembly 148 is fixed to the opposite end of the shaft and is electrically connected to the rotor conductors in a conventional manner. A brush assembly 150, consisting of a brushholder 152 and four brushes and associated springs, such as brush 154 and its spring 156, is fixed to the front cap 122. The details of this novel brush assembly and another embodiment thereof will be described in more detail below in conjunction with subsequent figures.

A control housing 160 integral with the motor housing 120 contains a pair of ganged potentiometers 162 and 164. Potentiometer 162 contains resistance windings 166 and a rotatable wiper contact 168, while potentiometer 164 similarly contains resistance windings 170 and a rotatable wiper contact 172. The wiper contacts are fixed to a rotatable speed control shaft 174 which extends upwardly through a tubular housing 176 and the outboard motor top housing 178 where its top end is detachably coupled to a manually operated motor speed control lever 180. The cables 182 are adapted to be connected to a suitable d.c. power source, such as storage batteries, so that power is supplied by these cables, through the potentiometers and conductors 184 and 186 to the brush pigtails, such as pigtails 188 and 190, and from there through the brushes and commutator to the windings of rotor 138.

The potentiometers 162 and 164 are conventional with one important exception. The potting compound has been removed from the resistance windings of each potentiometer so that the environmental water flows through the openings 165 in the control housing 160 into direct contact with the resistance windings and the movable wiper contacts 168 and 172. Since this water is flowing through the housing into direct contact with these electrically conductive metal elements, the heat generated in the potentiometers is quickly removed, thereby permitting the potentiometers to dissipate powers much greater than their power ratings. Contrary to what might be expected, no short-circuiting occurs, and, therefore, much smaller and less expensive potentiometers may be used than would otherwise be required but for the high degree of heat transfer provided by the environmental water flowing into direct contact with the current conducting elements of the potentiometers. For example, I have used potentiometers which were rated at 25 watts to carry 4,800 watts at 48 volts and 100 amperes.

Figure 6:
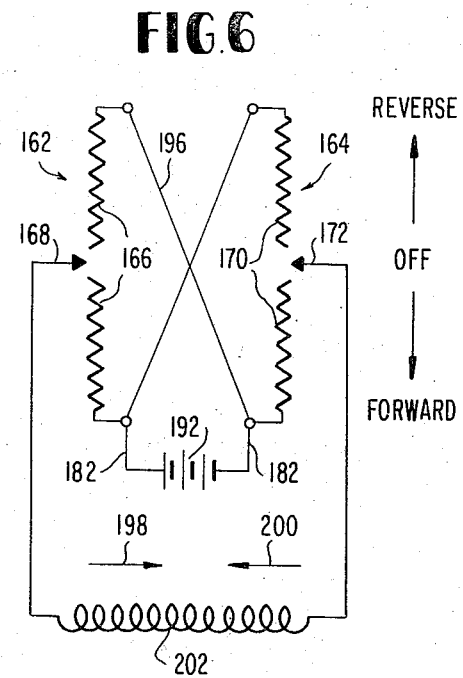
FIG. 6 is a schematic circuit diagram of the speed control for the motor illustrated in FIG. 5.

A schematic circuit diagram for the continuously variable reversible speed control formed by the potentiometers 162 and 164 is illustrated in FIG. 6. For ease of understanding, the same reference numerals are used in FIGS. 5 and 6 to identify corresponding components. It can be seen that a battery 192 is connected across the cables 182, which in turn are connected across the lower ends of the resistance windings 166 and 170 of the potentiometers 162 and 164, respectively. Furthermore, a conductor 194 interconnects the lower end of resistance winding 166 and the upper end of resistance winding 170, and a conductor 196 interconnects the lower end of resistance winding 170 and the upper end of resistance winding 166. The center portion of each resistance winding is interrupted and corresponds to the OFF position of the motor. The wiper contacts 168 and 172 are ganged together by virtue of their being fixed to the speed control shaft 174; therefore, these contacts move together across their respective resistance windings. These contacts are shown in the interrupted portions of the resistance windings, corresponding to the OFF position of the motor. To energize the motor in the forward direction, the speed control handle 180 and, consequently, speed control shaft 174 are rotated such that the wiper contacts move into engagement with the lower portions of the resistance windings 166 and 172, thereby causing current to flow through rotor windings 202 in the direction indicated by the arrow 198. The maximum speed of the motors occurs when maximum current flows to the rotor, i.e., when the wiper contacts 168 and 172 are in their lowermost positions. Similarly, when it is desired to drive the motor in the reverse direction, the contacts 168 and 172 are moved into engagement with the upper portions of the resistance windings 166 and 170, in which case, current flows through the rotor windings 202 in the direction indicated by the arrow 200. The maximum speed of the motor in the reverse direction is reached when the wiper contacts 168 and 172 are in their uppermost positions.

Figure 7:
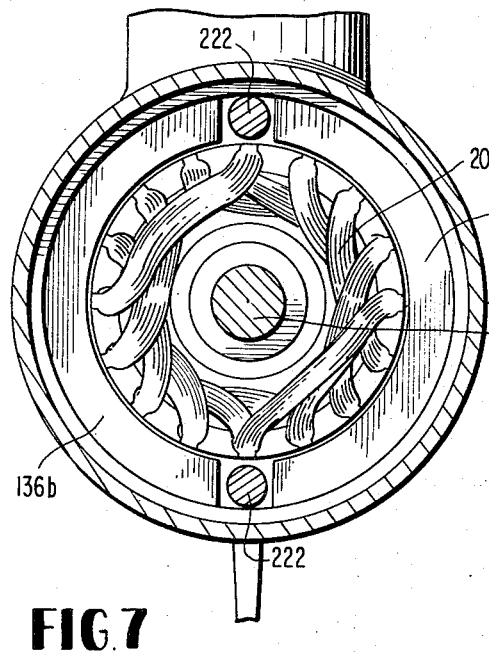
FIG. 7 is a cross-sectional view taken along line 6—6 of FIG. 5.

Let us now return to the structure of the motor illustrated in FIG. 5. FIG. 7 is a cross-sectional view taken along lines 7—7 in FIG. 5 and shows in more detail the field and rotor structure of the motor, including the rotor winding 202, and which does not contain any potting compound to keep the water out of contact therewith as is the case in prior art motors. The water also flows into direct contact with the rotor winding extensions 205 which are uninsulated at their points of connection to the commutator segments. It is also seen that the permanent magnet field 136 consists of two substantially semicircular magnets 136a and 136b.

FIG. 8 is a cross-sectional view taken along line 8—8 of FIG. 5. FIG. 9 is a cross-sectional view taken along line 9—9 of FIG. 8. These two figures illustrate in more detail one embodiment of my novel brush assembly for use with this motor. The exploded view in FIG. 10 adds further detail and also shows the manner in which a brush and spring are assembled into brushholder 152.

The brushholder is secured to the end cap 122 by means of screws 203 and contains a central bore 204 through which a reduced portion 206 of shaft 140 passes.

Brushholder 152 consists of four substantially trapezoidal-shaped recesses 210 for receiving the substantially trapezoidal-shaped brushes 154. Each recess 210 is open on the commutator side and is closed by the backing plate 212 on the other side. Extending longitudinally along the length of each recess 210 is a cylindrical bore 214 for receiving the cylindrical brush spring 156. A cylindrical recess 216 is formed in back of each recess 210 for receiving one end of the spring 156.

Each brush 154 has a shoulder 218 which engages or abuts against the lip 220 on the commutator side of each brushholder recess 210. As can be clearly seen from FIG. 9, spring 156 urges the brush 154 to the right against the commutator 148, and as the brush wears, shoulder 218 approaches the lip 220. When the shoulder and lip are in engagement, the brush can move no further toward the right. Such an arrangement prevents the pigtail 188 or the spring 156 from scoring the commutator 148 as the brush wears down.

Figure 10:
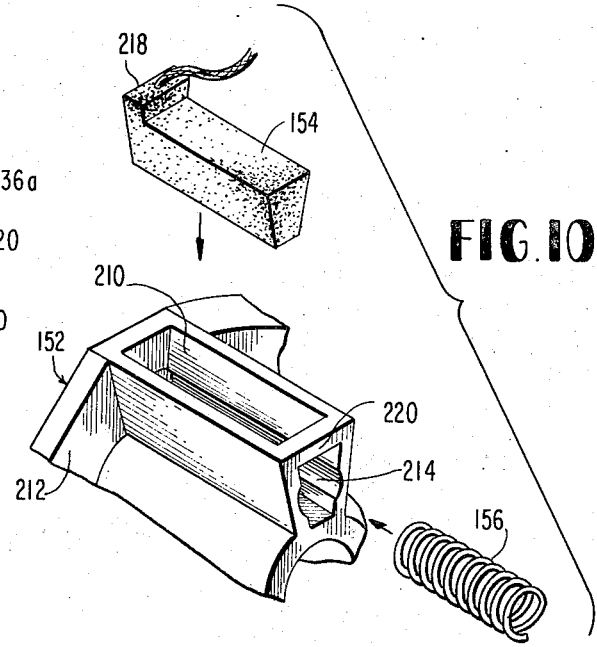
FIG. 10 is an exploded view showing the manner in which the brush is inserted into the brush assembly of FIG. 8.

FIG. 10 shows the manner in which the brush 154 and the spring 156 are assembled into the brushholder 152. First, the spring 156 is inserted into the cylindrical bore 214 in the open end of the trapezoidal recess 210 and then is compressed against the back plate 212 so that the brush 154 may be inserted into the open top of the recess. Then, the spring is released so that it pushes the brush 154 out of the open end of the recess into engagement with the segments of the commutator 148. Access to the brushholder is obtained by removing the throughbolts 222 which extend through the motor housing and keep the end caps in place.

FIGS. 11, 12, and 13 illustrate another novel brush assembly for use with my motor. The same reference numerals will be used to identify parts which correspond to those in the preceding figures. The basic differences in the second embodiment of the brush assembly are that the shoulder on each brush is replaced by a metal cap which provides an improved electrical contact between the brush and the pigtail, and both the brush and spring are inserted through the open end of the recess rather than one through an open end and one through the top thereof. In this case, a brushholder 226 again consists of four essentially trapezoidal-shaped recesses 228 for receiving the substantially trapezoidal-shaped brushes 230. Each recess is slightly larger than the brush to accommodate the end cap 232 so that the end cap is permitted slide within the recess. The commutator end of each recess has a lip 236 which effectively reduces the size of the opening to permit the brush to project therethrough without wobbling. The metal cap makes a large area, low resistance contact with the brush, and also provides a convenient means for the attachment of the pigtail 234. The lip 236 acts as a stop which abuts against the end cap 232 when the brush has reached its maximum wear position. The brush spring 238 seats in a cylindrical recess 240 formed in the backing plate 242 and pushes against the end cap 232 to urge the brush 230 against the commutator 148. A slot 244 in the top of each brushholder recess permits the pigtail to move longitudinally of the recess as the brush wears down. The backing plate 242 is secured to the brushholder 226 by means of two screws 246.

In order initially to assemble the brush assembly, the backing plate 246 is unscrewed from the brushholder 226 and removed. The spring 238 and the cap 232 are then inserted into the exposed back end 248 of the recess. The backing plate 242 is then again secured to the brushholder. The brush 230 is then inserted into the front end 249 of the recess and pushed back toward the backing plate until the brush snaps into the cap 232. New brushes can be inserted in the same manner without removing the backing plate.

Figure 14:
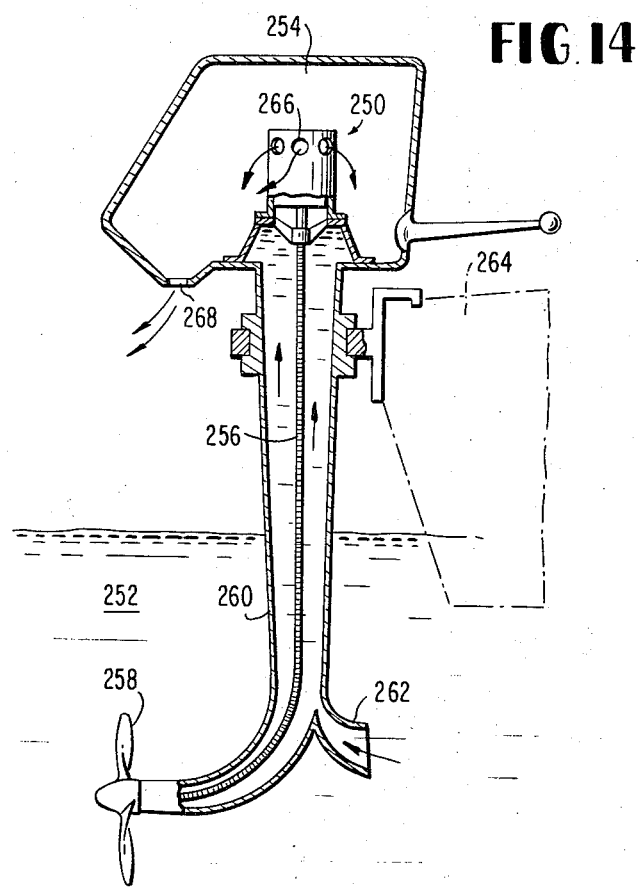
FIG. 14 illustrates another embodiment of the invention in which the motor is mounted in the top housing of the outboard motor assembly.

FIG. 14 illustrates another variation of my invention wherein the d.c. motor 250 is not submerged in the actual body of environmental water 252, but rather is mounted in the top housing 254 and effectively submerged by environmental water pumped up to the housing. The rotor shaft of the motor is connected via a flexible drive shaft 256 to the propeller 258. In this embodiment, a tubular housing 260 extends between the propeller and the top housing and has a tubular projection 262 which opens in the direction toward the front of the boat 264. As the boat moves through the water in the forward direction, water is forced through the projection 262 and up the tubular housing 260 through the openings in the lower end of the motor and out of the openings 266 in the top end of the motor housing, then into the top housing 254 and out of openings 268 in the bottom of the top housing. In such an arrangement, the environmental water still continues to pass through the internal structure of the motor into direct contact with the exposed, uninsulated brush and commutator segments, and with the rotor and field, as described in connection with the previous embodiments.

Let us now return again to FIG. 5 which shows a novel top housing 178 for an electric outboard motor. As previously described, the speed control shaft 174 passes upwardly through the top housing to terminate in the speed control lever 180. This lever is connected to a coupling member 270 which is fixed to the housing and has a slot 272 for detachably receiving a reduced portion 274 of the shaft 174. The reduced portion and the slot form a slip fit with each other. The top housing 178 has a top lid portion 276 and a lower portion 278 hinged together by a hinge 280. When the lid portion 276 is rotated upwardly about the hinge 280, the coupling member 270 disengages from the reduced shaft portion 274, revealing a convenient storage container for tools and fishing gear and supplies. When the lid portion 276 is closed, the slot 272 again engages the reduced shaft portion 274 so that the speed control lever 180 is operatively connected with the speed control shaft 174.

Even though I have disclosed my invention in preferred embodiments as an outboard boat motor, the completely exposed d.c. motor may be used in other forms of underwater boat propulsion where the internal motor structure is completely exposed to the environmental water. The exposed motor may also be used to drive an impeller and function as an environmental water pump, in which case the motor is submerged in, and exposed to, the environmental water being pumped. Furthermore, the field for the motor may be supplied either by permanent magnets or field windings.

While my invention has been particularly shown and described with reference to preferred embodiments thereof, it will be understood by those skilled in the art that various changes in form and detail may be made therein without departing from the spirit and scope of the invention.

I claim:

1. A d.c. electric outboard motor adapted to be mounted on a boat and operated while submerged in the environmental water in which the boat is floating, comprising:
   a. a motor housing having a plurality of apertures therein for permitting the flow of the environmental water through the internal motor structure;
   b. a shaft rotatably mounted in said housing;
   c. a propeller fixed to one end of said shaft external to said housing;
   d. a motor rotor fixed to said shaft within said housing;

e. a commutator assembly fixed to said shaft within said housing;

f. a brush assembly fixed to said housing and in electrical contact with said commutator assembly;

g. motor field means fixed to said housing; and h. a pair of motor terminals on said housing and electrically connected to said brush assembly and adapted to be connected to a source of d.c. power for energizing said motor, whereby the environmental water flows through said motor housing in direct contact with said rotor, said commutator assembly, said brush assembly and said field means.

2. A d.c. electric outboard motor as defined in claim 1 wherein said field means comprises a field winding electrically connected to said terminals.

3. A d.c. electric outboard motor as defined in claim 1 wherein said field means comprises a permanent magnet.

4. A d.c. electric outboard motor as defined in claim 1 wherein said rotor comprises teeth and windings formed in a spiral configuration so that upon rotation of said shaft in a predetermined direction the pumping action produced by said rotor teeth and said rotor windings is such as to force the environmental water through the motor housing in the same direction in which the water is forced through the housing by the motion of the boat as it is propelled through the water by said propeller.

5. A d.c. electric outboard motor as defined in claim 1 further comprising screens mounted over said plurality of apertures in said motor housing.

6. A d.c. electric outboard motor as defined in claim 1 wherein said motor housing comprises a cylindrical casing closed by end plates on opposite ends thereof, said apertures being formed in said casing adjacent said brush assembly and in said end plates.

7. A d.c. electric motor as defined in claim 1 further comprising a storage battery connected to said motor terminals and having a rated output voltage in the range of from approximately 6 volts to approximately 48 volts.

8. A d.c. electric motor as defined in claim 7 wherein said environmental water ranges from fresh water to salt water having a range of specific gravities from 1.000 to 1.025, respectively.

9. A d.c. electric outboard motor as defined in claim 1 further comprising potentiometer means mounted in said housing for controlling the speed and direction of rotation of said motor and being adapted to be electrically connected between said motor terminals and said d.c. power source, said potentiometer means comprising at least one potentiometer having an uninsulated resistance and an uninsulated movable wiper contact in engagement therewith, said winding and contact being submersed in, and completely exposed to, the environmental water.

10. A d.c. electric outboard motor as defined in claim 1 further comprising a top housing adapted to be secured to the boat above the surface of the water, means mounting said motor housing in said top housing, and a conduit having one end in communication with said top housing and the other end in communication with the water, whereby movement of the boat through the water causes the water to pass through said conduit into said top housing and through said apertures in said motor housing.

11. A d.c. electric outboard motor as defined in claim 1 further comprising a top housing fixed to said motor housing and adapted to be mounted on said boat, said top housing having a lid portion hinged to a lower portion, the two portions forming a storage container.

12. A method of operating a d.c. electric motor having internal structure including a field means, a rotor, a brush assembly and a commutator assembly, said method comprising continuously passing impure environmental water through the motor in intimate contact with the internal structure thereof, including the brush assembly and the commutator assembly.

13. A method of operating a d.c. electric motor as defined in claim 12 wherein said motor is an outboard boat motor, and further comprising securing the motor to a boat floating in the water so that the motor is above the surface of the water, and pumping the water through the motor in intimate contact with the internal structure of the motor.

14. A method of operating a d.c. electric motor as defined in claim 12 wherein said motor includes a housing enclosing the internal structure, and further comprising forming apertures in said housing, and submerging the motor in the environmental water so that the water flows through the apertures into intimate contact with the internal structure of the motor.

15. A method of operating a d.c. electric motor as defined in claim 14 wherein said motor includes speed control means having at least one potentiometer having an exposed uninsulated resistance winding and a movable wiper contact in engagement with the winding, the method further comprising submersing the potentiometer in the water so that the water flows through the potentiometer in intimate contact with the winding and wiper contact, whereby the heat generated in the internal structure and potentiometer is dissipated with great rapidity.

* * * * *